April 20, 1965     G. T. McMILLAN     3,179,473

COUPLER MEANS

Filed July 13, 1960     2 Sheets-Sheet 1

INVENTOR.
GEORGE T. MC MILLAN
BY
John L. Woodward
ATTORNEY

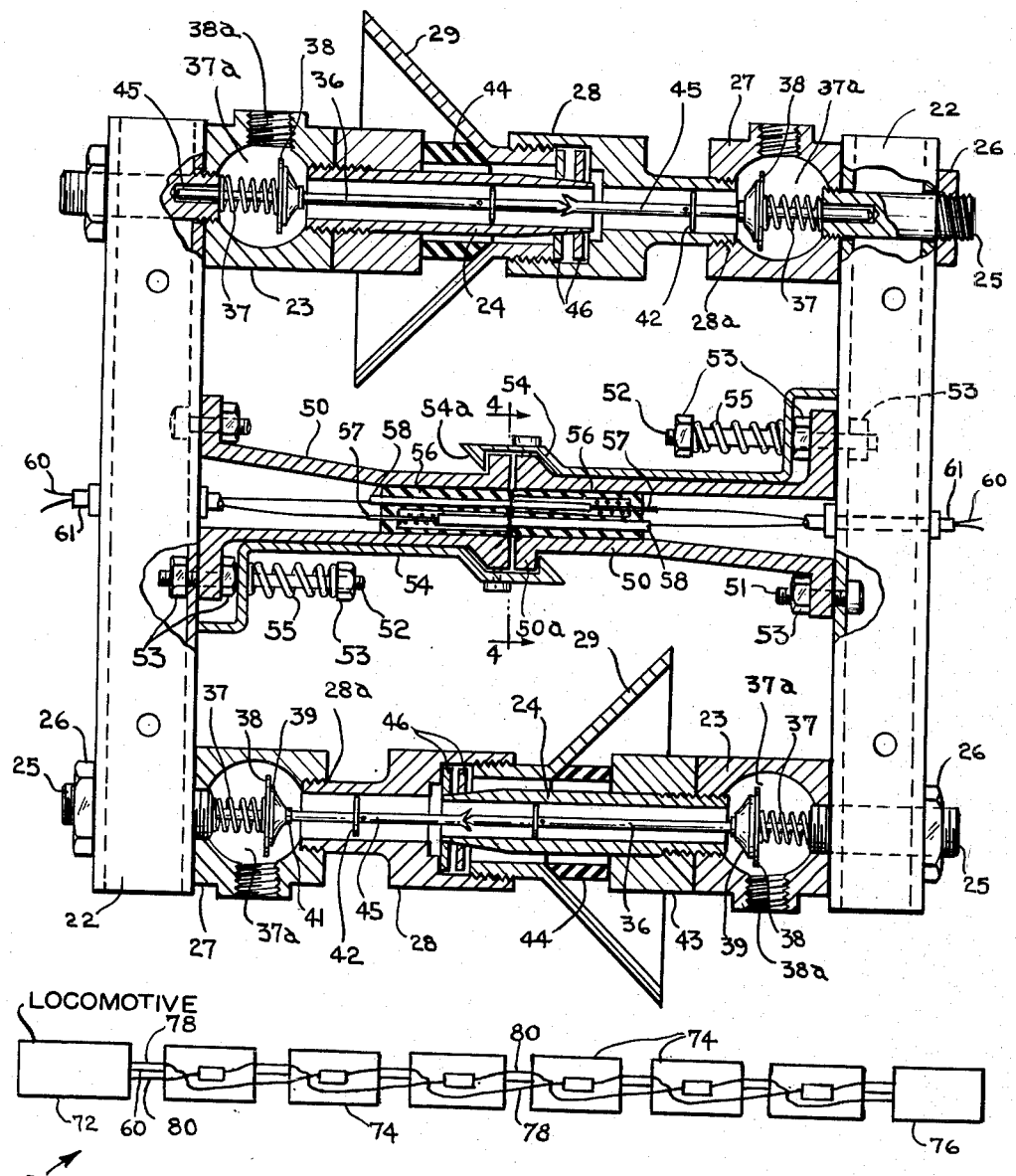

United States Patent Office 3,179,473
Patented Apr. 20, 1965

3,179,473
COUPLER MEANS
George T. McMillan, 3940 30th Ave. S.,
Minneapolis, Minn.
Filed July 13, 1960, Ser. No. 42,665
4 Claims. (Cl. 303—1)

This invention relates to a new and useful automatic air brake coupling means for trains and train-wire coupling means.

It is an object of this invention to provide simultaneous automatic air brake coupling and train electric wire coupling for trains.

It is another object of this invention to provide automatic air brake coupling means for trains whereby the brakes on every other car may be set at one time, and the brakes on the alternate cars may be set at another time.

It is still another object of this invention to provide air brake coupling means for trains comprising two separate and independent air brake coupling means.

It is yet another object of this invention to provide automatic air brake means for trains where air brakes are used for checking the speed of the train of two separate and independent air brake coupling means and means for automatically interlocking the electrical wires for the train.

Heretofore, the air brake couplers for cars of trains have been coupled together by a single coupling means and the brakes of all cars were set consecutively. My novel device comprises a pair of separate air brake couplers for each end of every two adjacent meeting cars, and one of the air brake couplers is connected by pipes to brakes of every other car while the other of the coupler's means is connected by pipes to the brakes of the alternate cars of a train. In such a construction, the brakes on every other car can be released and cooled after the brakes are set on the alternate cars of the train.

My novel coupling means eliminates all hand operated air brake couplings and all hand operated angle cock valves which eliminate a lot of hard labor for the train crews and allows rapid coupling and uncoupling of train cars.

My invention resides in the new and novel construction combination and relation of the various parts hereinafter described and shown in the drawings accompanying this specification.

In the drawings accompanying this specification:

FIGURE 3 is a sectional view of the ends of two cars showing my novel automatic hose coupling means and the automatic train wire coupling means.

FIGURE 6 is a diagrammatic view of a train employing my novel air hose coupling means.

Figure 1:
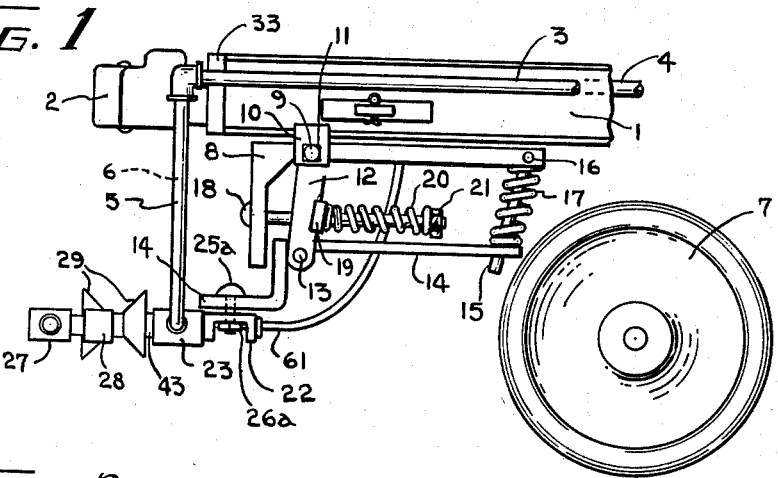
FIGURE 1 is a side elevation of the lower portion of the end of a box car showing a portion of my novel automatic air brake coupling.
Figure 2:
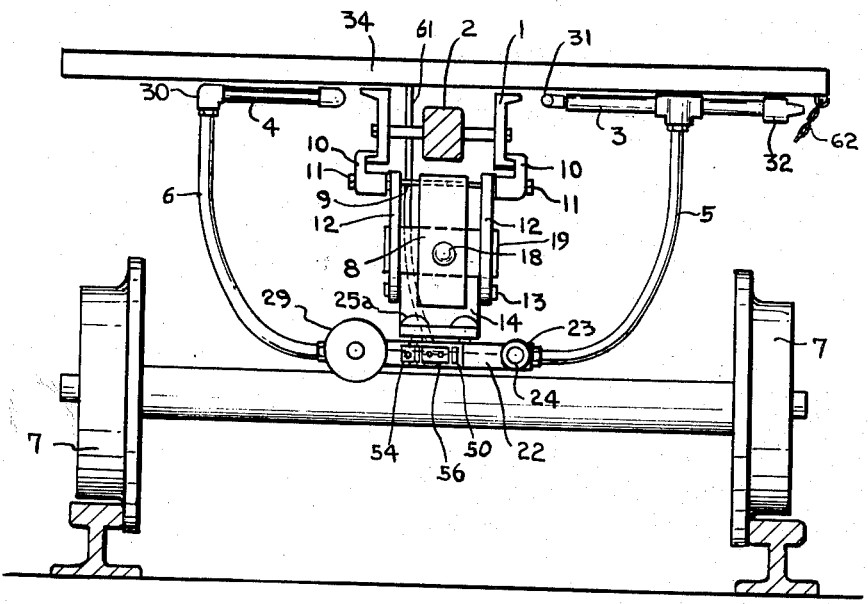
FIGURE 2 is a front elevational view of the end of a box car showing a portion of my novel automatic hose coupling.
Figure 4:
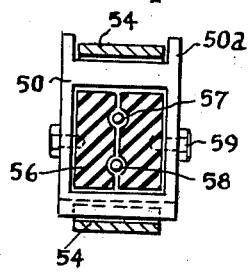
FIGURE 4 is a sectional view on line 4—4 of FIGURE 3 disclosing the interlocking means for the train wire coupling means.
Figure 5:
FIGURE 5 is an end view of a bar on one end of a car for mounting a portion of the hose and train wire coupling means.

Referring to the drawings in detail 1 is a draw bar frame and 2 is the draw bar of an ordinary railway car. Left and right air pipes 3 and 4 are respectively connected to left and right rubber air hoses 5 and 6. The box car is supported by truck wheels 7.

A suspension assembly for supporting one half of the air hose and train-wire coupling means on the adjacent end of two meeting cars consists of an angular bracket hanger 8 fastened to the draw bar frame 1 by means of clamp 10, bolt 9 and nut 11. A pair of spaced apart depending arms 12 are pivotally carried by bolt 9, and a cross bolt 13 is connected between the lower ends of the hanger arms, 12.

A flat plate 14 extends horizontally from adjacently below the rear end of the bracket 8 and over the bolt 13 and is then extended downwardly and outwardly from the horizontal portion of plate 14. A rod 15 is pivotally carried by a bolt 16 mounted in the rear end of the hanger bracket 8. The lower end of rod 15 extends loosely through a hole in the rear end of the plate 14, and a compression spring 17 is mounted around rod 15 and spaced between the rear ends of the bracket 8 and plate 14. The compression spring 17 on rod 15 urges the rear end of plate 14 downwardly. A relatively long bolt 18 extends through the depending portion of bracket 8 and is then threaded through an aperture in a cross member 19 mounted behind the hanger arms 12. A coil spring 20 is mounted on bolt 18 between cross member 19 and a nut 21 threaded on the rear end of bolt 18. The coil spring 20 on the bolt 18 urges cross member 19 against hanger arms 12 and bolt 13 in hanger arms 12 moves plate 14 forwardly. The lower end of plate 14 is secured by bolt and nut means 25a and 26a to a U-shaped bar 22. Left male member 23 is secured to bar 22 by the bolt and nut means 25 and 26. The right female member 29 is mounted to the other end of the bar 22 by bolt and nut means 25 and 26. This suspension support is a flexible means for the air hose coupling means. When a train using my flexible suspension means is traveling on a curved track, the suspension means will yield in all directions and the air hose coupling means will not uncouple.

The end of the adjacent meeting car is also provided with a similar suspension support for the other half of the air hose coupling means and its male and female member 23 and 29 are in alignment with the female and male members on the first of the said adjacent cars.

The male member 23 mounted on the lower end of the bar 22 on the right of FIGURE 3 comprises an elongated tubing 24 tapered at its outer end and screw threaded at its inner end to the valve body and an intermediate nut 43. The inner end of the tubing 24 is provided with a valve seat. An elongated valve stem 36 is mounted for movement in the tubing 24, a metal washer and rubber washer 38 are mounted on the inner end of stem 36 and a coil spring 37 spaced between washer 39 and inner end of the valve body tends to urge the washer 38 to seat on the valve seat on the tubing 24. An outlet 38a is connected by means of a chamber 37a in housing 23 with tube 24.

A female member 27 is mounted on the opposite end of the bar 22 at the right of FIGURE 3 and comprises a valve body portion 28a with an intermediate valve body portion 28 threaded to portion 28a. A flaring outer end 29 is attached to the intermediate valve body portion 28. A relatively short valve stem 45 is mounted for longitudinal movement in the passage in the valve body parts and a spring 37 actuates valve 39 normally to seat on the valve seat in the intermediate body portion 28.

When the adjacent ends of two box cars meet and are coupled together, the tubing 24 of male member 23 at bottom of FIGURE 3 enters the flaring portion 29 of the female member 27 and the tapered outer end of tubing 24 engages the gasket 46 on the inside of intermediate body portion 28 of the female member 27. Now the outer end of valve stem 36 in the male member 23 engages the valve stem 45 in the female member 27 and the valves in the male and female members are moved from their seats and this permits compressed air to travel to every other car.

At the time the male and female member at the top of the FIGURE 3 couple together, and the male member 23 on the bar on the left side of FIGURE 3 couples with the female member 27 on the bar 22 at the right side of FIGURE 3 thus permitting their valve stems 36 and 45 to unseat the valves in male and female members thus permitting compressed air to flow to the alternate cars of the train. When the two cars of a train are uncoupled, the two pair of male and female members 23 and 27 start to uncouple and the ends of the valve stems 36 and 45 separate and springs 37 move the valves to seat on the valve seats in the male and female members before the tapered ends of the tubing 24 of the male members 23 separate from contact with the packing rings 46 and as a result the only air lost in uncoupling the air brake coupling means is the air in the coupling means between the valves of the male and female members 23 and 27 respectively. In this design of valve structure very little air is lost.

One pair of the male and female members are designed to be connected to the brakes of every other car in the train while the other male and female members are designed to be connected to the brakes of the alternate cars of the train.

A hard rubber bumper 44 is mounted on the male members 23 adjacent nut 43 and functions as a seal to prevent dust entering the coupling or air leaking out, and the bumper 44 cushions the engagement of stem 36 with 45 to prevent damage to stem 45. Centering pins 42 are mounted on rods 36 and 45 for maintaining the rods 36 and 45 in alignment in the couplers. Intermediate the pair of valve structure means, locking means are provided for holding the train line wire coupling means in coupled relationship. Two spaced apart bars 50 square at their outer ends are secured by bolt and nut means 51 and 53 at their inner ends to each of the bars 22 on the ends of the two meeting cars. The bars 50 abut each other at their outer ends when the adjacent ends of the two meeting cars are coupled together. A holder 54 is mounted at its inner ends by bolt and nut means 52 and 53 to each of the bars 22. The holders 54 are each provided with a hook 54a at their outer ends which face each other for engaging shoulder means 50a on bars 50. A coil spring 55 is mounted on the bolt 52 between nut 53 and an inner portion of the holder 54 thus providing spring tensioned holders 54.

A split insulation 56 is mounted by set screws 59 to the inner end of the bars 50, and spring action contact points 57 and fixed contacts 58 are soldered to insulated electric line wires 60. Flexible conduit 61 encases the electric wires 60 to prevent damage to the electric wires 60. When the interlocking means are locked together, two sets of electric signal lights are lighted in the caboose and engine of a train.

When the two adjacent cars are uncoupled, the male and female members are separated from each other and the holders 54 disengage from the shoulders 50a on bars 50 thus separating the spring contacts 57 from the fixed contacts 58. Assuming that the impact for uncoupling the coupler members has been applied to the bar 22 on the left side of FIGURE 3, then the outer end of bar 50 at the upper side of the locking means pulls holder 54 forward until the end of its tapered portion engages the elevated portion on the upper side of bar 50 in the right upper side of FIGURE 3, then catch 54a has been moved to unlocked position beyond the shoulder 50a on the bar 50 on the upper left side of FIGURE 3. As the upper catch 54a is moved to its unlocked position, the tapered portion on the bar 50 on the lower left side of the locking means is moved away from the bar 50 on the lower right side of the locking means until the elevated portion on the lower side of the bar 50 on the lower left side of the locking means engages the straight portion merging with the tapered portion on the holder 54 on the lower left side of the locking means, then the lower catch 54a has been moved outwardly from engagement with shoulder 50a on the bar 50 positioned at the lower right side of the locking device.

Trains using my automatic air hose means and automatic train line wire coupling means eliminate a lot of hard labor for the train men and also provide a safe means for setting the air brakes which prevent injury and death to the train crews.

The use of two air brake coupling devices provide means for setting one half the brakes on the train at one time and then setting the other half of brakes at a latter time and then releasing the first half of brakes.

The accidental uncoupling of the train wire lines will signal the engineer in the engine and the brakeman in the caboose that the cars are uncoupled and they can start setting the brakes to stop the strain.

The numeral 31 represents a pipe plug which can be removed from the air pipe 3 for the mounting of an angle-cock valve thereon. The numeral 32 is a back-up valve in air pipe 3 for use by trainmen for setting the brakes.

FIGURE 6 is a diagrammatic view of the train 70 which comprises an engine 72, cars 74 and a caboose 76. This view discloses the connection and application of my novel air hose coupling means employing two separate air hose lines. Line 78 extends from the engine 72 through the cars 74 to the caboose 76. Line 78 is connected to the air brakes of every other car 74 while a second air line 80 extends from the engine 72 through cars 74 to the caboose 76 and is connected to the air brakes in the alternate cars 74. Valve means in the engine 72 control the flow of air through the air lines 78 and 80. The engineer may actuate the valve to open position for line 78 which sets the brakes for every other car 74 in the train 70. Then the engineer can now actuate the valve for the line 80 to open position and compressed air sets the brakes on the alternate cars 74 of the train 70. In such an arrangement the trains can be stopped quicker with less damage to the truck wheels of the cars. In using this type of system, the brakes on a train can be set twice as fast as the brakes on a train using the conventional one hose lines.

It is to be understood that change in the parts and arrangements of the elements may be made without departing from the principle or sacrificing any of the advantage of the invention claimed.

Having thus described my invention, what I claim is:

1. In an automatic air brake coupling means, the air brake coupling means adapted to be carried underneath the ends of two meeting cars and to be connected with train pipes of the cars comprising a male member mounted on one of said cars, a female member and a male member on the other of said cars, the male and female members on the said one car automatically coupling with the female and male members on the other of said cars when the cars came together, a passage and valve seat provided in each of the male members, a valve stem mounted for movement in the passage in each of the male members, a spring actuated valve member mounted on the valve stem in each of the male members for seating on the valve seat in each of the male members, a passage and valve seat provided in each of the female members, a valve stem mounted for movement in the passage of each of the female members carrying a spring actuated valve member for seating on the valve seat in each of the female members, the stems of the male and female members engaging each other upon the male and female members coupling with each other, unseating the valves in the male and female members, a tapered end portion formed on the outer end of the male members, sealing means formed intermediate and inside the female members, said male member having a surface for engagement with said intermediate sealing means and said tapered end portion engaging the sealing means inside the female member, whereby the valves in the male and female members are closed before the tapered end of the male members disengage the sealing means in the female members, as the male and female coupling means uncouple.

2. In combination, an automatic air brake coupling means, the air brake coupling means adapted to be carried underneath the ends of two meeting cars and to be connected with train pipes of the cars comprising a male member and a female member mounted on one of the said cars, a female member and a male member mounted on the other of said cars, the male and female members on said one car automatically coupling with the female and male members on the other of said cars when the cars come together, a passage and valve seat provided in each of the male members, a valve stem mounted for movement in the passage in each of the male members, a spring actuated valve member mounted on the valve stem in each of the male members for seating on the valve seat in each of the male members, a passage and valve seat provided in each of the female members, a valve stem mounted for movement in the passage of each of the female members carrying a spring actuated valve member for seating on the valve seat in each of the female members, the stem of the male and female members engaging each other upon the male and female members coupling with each other unseating the valves in the male and female members, locking means including hook means and shoulder means being in substantial alignment with each other on the ends of the cars positioned between the said male and female members and electric contacts on the shoulder means of the locking means engaging and disengaging with and from each other upon the male and female coupling means coupling and uncoupling with each other and the hook means locking with the shoulder means of the locking means.

3. In combination an automatic air brake coupling means adapted to be carried underneath the adjacent end of a plurality of railroad cars and to be connected with the train pipes of the cars, comprising a first pair of male and female members mounted on one end of said cars for automatically coupling with a second pair of female and male members mounted on the other end of said cars, when the cars come together said first pair of male and female members connected by train pipes to every other car brake, the second pair of male and female members connected by the pipes to the alternate car brakes, a passage and valve seat provided in each of the male members, a valve stem mounted for movement in the passage of each of the male members carrying a spring actuated valve member for seating on the valve seat in each of the male members, a passage and valve seat provided in each of the female members, a valve stem mounted for movement in the passage of each of the female members carrying a spring actuated valve member for seating on the valve seat in each of the female members, the stem of the male and female members engaging each other upon the male and female members coupling, unseating the valves in the male and female members thereby permitting compressed air to flow to the car brakes, locking means including a spring tensioned holder means having a tapered portion merging with a flat elevated portion adjacent its outer end and being provided with a catch on its outer end mounted on the ends of the cars between the male and female members, and a pair of spaced bars mounted on the ends of each of the cars and positioned between the holders, first of the bars for each car being provided with a shoulder portion; the other of the bars for each car being provided a tapered portion merging with an elevated portion adjacent its outer end, the tapered and elevated portion on the holders engaging the tapered and elevated portion on the other of said bars and the catch on the two holders engaging the shoulder portion on the said first of the bars for each car when the male and female members are coupled together.

4. In a device as set forth in claim 3 wherein electric contact means are on the bars, and upon the male and female members coupling, the bars engage each other contacting the electric contacts with each other.

References Cited by the Examiner
UNITED STATES PATENTS

| | | |
|---|---|---|
| 109,695 | 11/70 | Westinghouse. |
| 515,220 | 2/94 | Harris et al. _____ 303—86 |
| 516,202 | 3/94 | Harris et al. _____ 303—86 |
| 2,119,460 | 5/38 | Gurton et al. |

ARTHUR L. LA POINT, *Primary Examiner.*

A. JOSEPH GOLDBERG, EUGENE G. BOTZ,
*Examiners.*